B. ESCHER.
ROTARY ENGINE.
APPLICATION FILED JUNE 9, 1910.

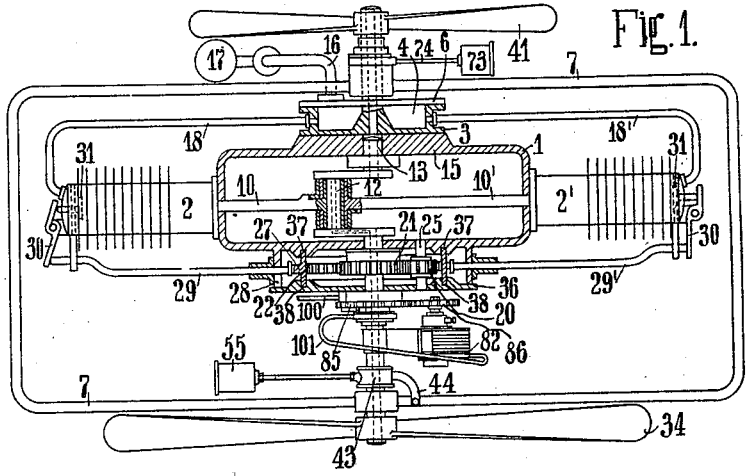

1,052,658.

Patented Feb. 11, 1913.
5 SHEETS—SHEET 2.

Witnesses
E. Schallinger
C. Rehm

Inventor
Bernhard Escher
by B. Singer
Atty

B. ESCHER.
ROTARY ENGINE.
APPLICATION FILED JUNE 9, 1910.
1,052,658.
Patented Feb. 11, 1913.
5 SHEETS—SHEET 3.
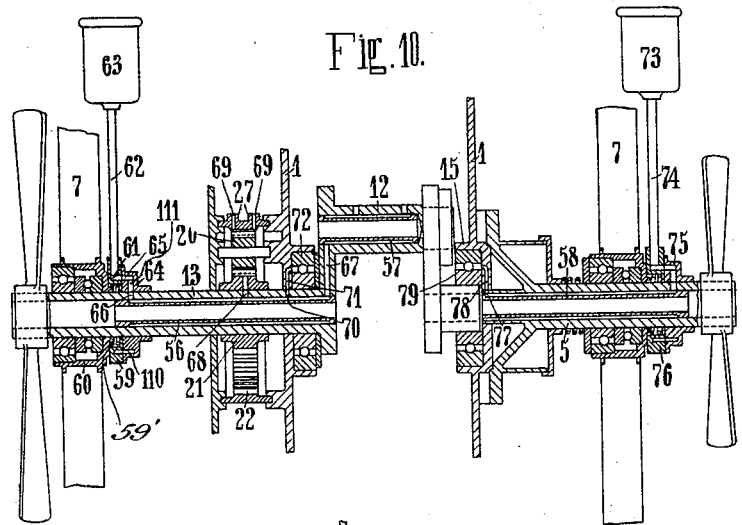
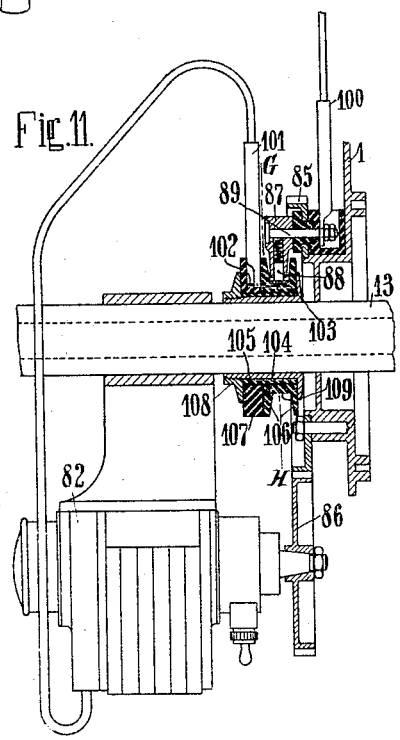
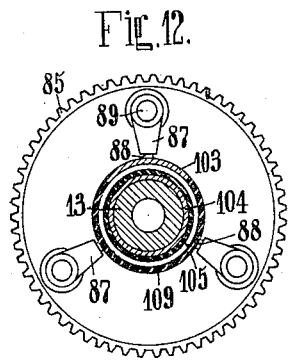
Witnesses
E. Schallinger
L. Rehm
Inventor
Bernhard Escher
by R. Singer
Atty B. ESCHER.
ROTARY ENGINE.
APPLICATION FILED JUNE 9, 1910.
1,052,658.
Patented Feb. 11, 1913.
5 SHEETS—SHEET 4.
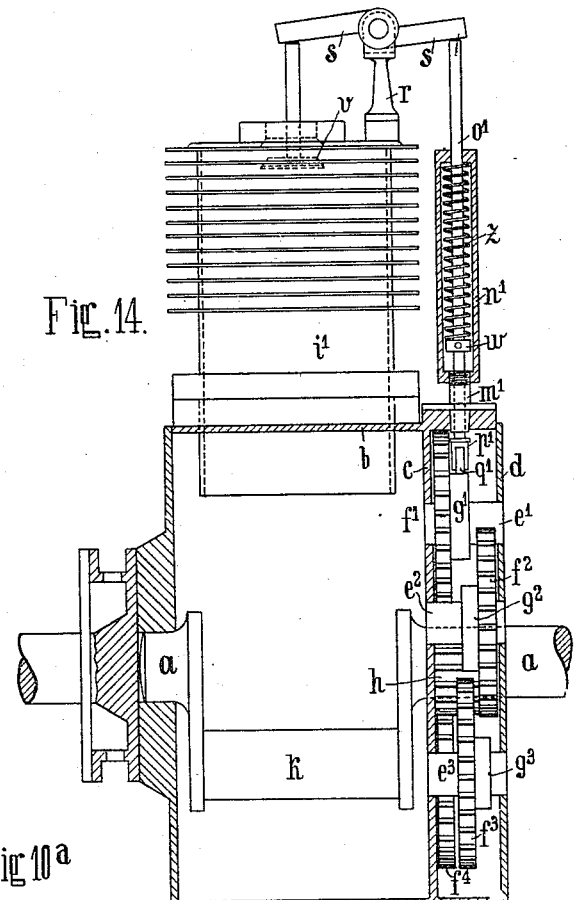
Fig. 14.
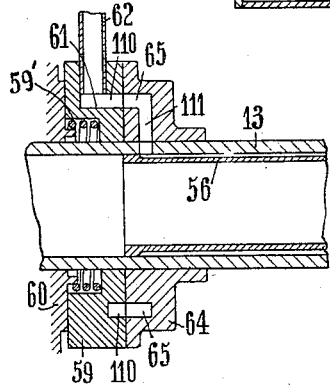
Fig. 10ª
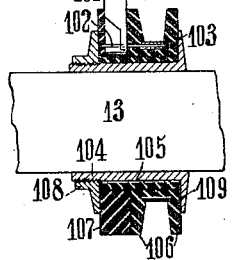
Fig. 11ª
Witnesses
E. Schallinger
C. Rehm
Inventor
Bernhard Escher
by B. Singer
Att'y

B. ESCHER.
ROTARY ENGINE.
APPLICATION FILED JUNE 9, 1910.

1,052,658.

Patented Feb. 11, 1913.
5 SHEETS—SHEET 5.

Witnesses
E. Schallinger
E. Rehm

Inventor
Bernhard Escher

UNITED STATES PATENT OFFICE.

BERNHARD ESCHER, OF CHEMNITZ, GERMANY, ASSIGNOR TO A. HORCH & CIE. MOTOR-WAGENWERKE AKTIENGESELLSCHAFT, OF ZWICKAU, GERMANY, A CORPORATION OF GERMANY.

ROTARY ENGINE.

1,052,658.      Specification of Letters Patent.      Patented Feb. 11, 1913.

Application filed June 9, 1910. Serial No. 565,977.

*To all whom it may concern:*

Be it known that I, BERNHARD ESCHER, a subject of the German Emperor, and residing at Chemnitz, Kingdom of Saxony, Germany, have invented certain new and useful Improvements in Rotary Engines, of which the following is a specification.

My invention relates in general to rotary engines and particularly to rotary engines for gaseous or liquid fuels, in which the crank-case and crank shaft rotate in opposite directions.

According to my invention, in contradistinction to engines of this kind known heretofore the crank-case runs out on the one side and the crank journaled therein runs out on the other side into shafts which are journaled coaxially in the frame of the engine. In this manner it is possible for both the crank shaft of the engine and also the oppositely-rotating crank-case to be used simultaneously for jointly delivering their full power, and propellers, for example, or other devices can be driven in opposite directions, so that the moments of inertia of the two rotating systems being equal all torque in the frame of the engine is negatived and equal angular velocity between the crank shaft and crank-case is obtained without employing a differential gear.

Some illustrative embodiments of my invention are represented by way of example in the accompanying drawings, wherein:—

Figure 8:
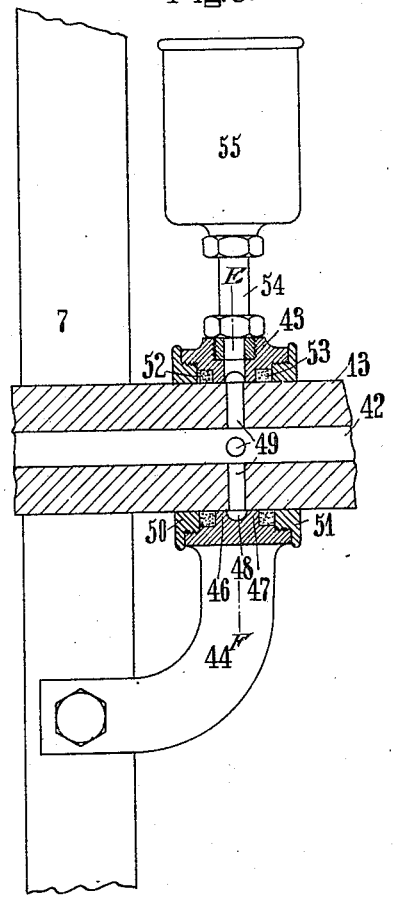
Figure 9:
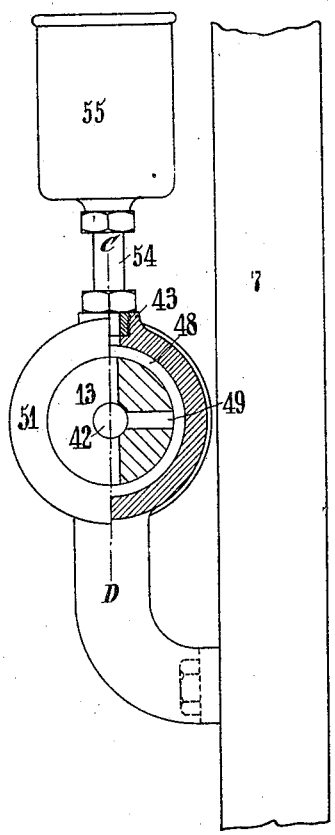
Figure 13:
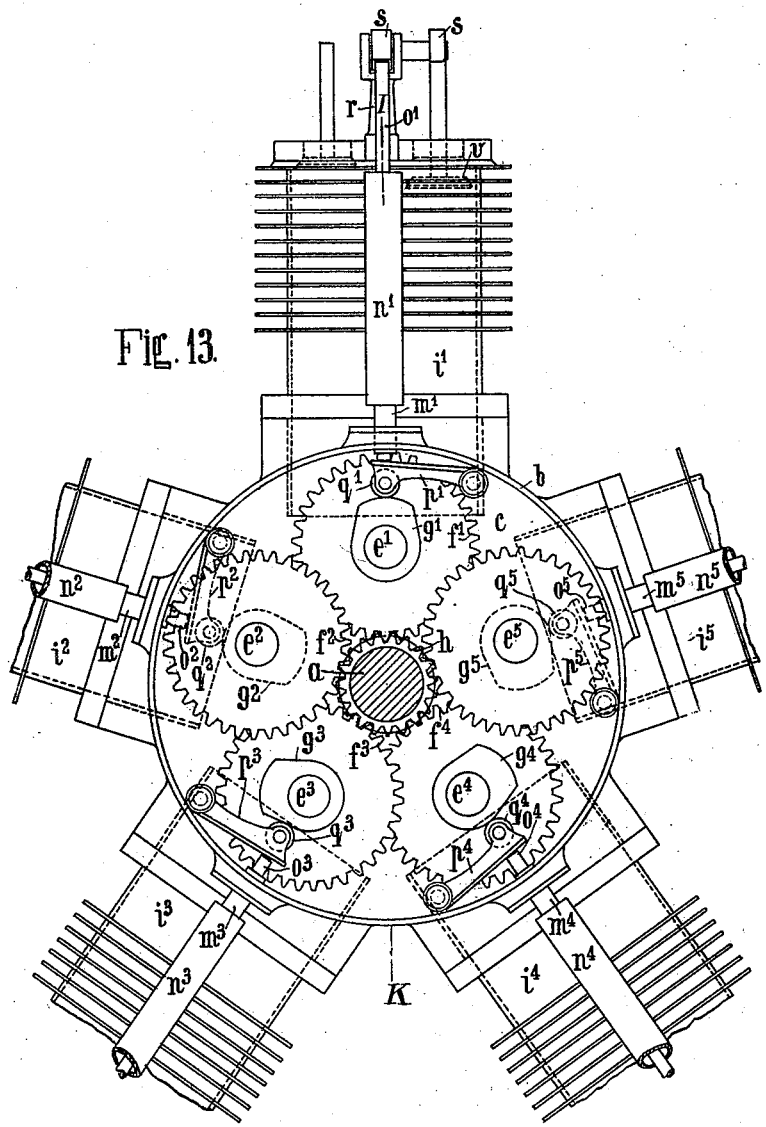

Figure 1 is a top plan view, partly in horizontal section on line A—B of Fig. 3, showing one form of my improved engine, Fig. 2 is a partial sectional side elevation showing the cam controlling the admission valves, and Fig. 3 is a side elevation of the engine; Figs. 4 to 7 show, enlarged, the straps of the connecting-rods surrounding the crank pin; Figs. 8 and 9 show, enlarged, the left-hand central lubricator of the engine, Fig. 8 being a longitudinal section on line C—D of Fig. 9 and Fig. 9 an end elevation partly in section on line E—F of Fig. 8, the sleeve in the hollow shaft at the lubricator being omitted; Fig. 10 shows a modified form of the central lubrication in longitudinal section, the same arrangement of ducts being used at both outside bearings, while Fig. 10ª shows, enlarged, a part of this form in longitudinal section; Figs. 11 to 12 show the ignition apparatus, Fig. 11 being a horizontal section through the same, Fig. 11ª a horizontal section, enlarged, through the current distributer, while Fig. 12 shows the carbon holders partly in elevation and partly in section on line G—H of Fig. 11. Figs. 13 and 14 show a second form of my improved engine; Fig. 13 is an end elevation and Fig. 14 partly a side elevation, partly in section on line J—K of Fig. 13..

Referring firstly to Figs. 1 to 3, 1 designates the crank-case, to which the cylinders 2, 2′, 2″ are secured. The receptacle or box 3, whose face 4 runs out into a shaft 5 is secured to the part 15 of the crank-case. The shaft 5 passes through the cover 6 of the box 3 and is journaled in the engine frame 7. In each of the cylinders is a piston pivotally connected with the connecting-rods 10, 10′, 10″ (Figs. 4 to 7). The connecting-rod 10 has a strap 11 (Fig. 6) surrounding the crank-pin 12 of the crank shaft 13. The connecting-rods 10′ and 10″ each have a strap 14′ and 14″, respectively, concentrically surrounding the strap 11 of the connecting-rod 10. The connecting-rod 10′ also has a strap 40′ (Fig. 7) surrounding the strap 14″. Also, the strap 40″ of the connecting-rod 10″ (Fig. 5) surrounds the strap 14′.

The crank shaft 13 is journaled at the one side in the crank-case 1 and in the engine frame 7, but at the other side only in the part 15 of the crank-case. The box 3 is connected by the pipe 16 with the carbureter 17. The plate 6 is rigidly connected with the engine frame. The annular chamber 4 in the box 3 is connected by the pipes 18, 18′ and 18″ with the combustion chambers of the cylinders 2, 2′ and 2″, respectively. The annular wall 28 is integral with the crank-case, and the plate 36 is held against this wall. The axle 25 is rigidly mounted in the wall of the crank case and in the plate 36. The pinion 20 is rotatable on the axle 25. The gear wheel 21 which is twice the diameter of pinion 20 is secured on the crank shaft 13. The internal gear 22 (Fig. 2) whose diameter is twice as large as that of gear wheel 21 is arranged concentrically around the same and is guided in two annular grooves 37, 38, of which the former is cut in the wall of the crank-case and the latter in the plate 36. This internal gear 22 is formed as a cam and has a projection or boss 27. The rods 29, 29′, 29″ which are each connected by a lever 30 with a valve 31 are mounted displaceable longitudinally in the annular wall 28. As soon as the boss 27 passes the end of one of the rods 29, 29′, 29″ it presses on the roller on a lever 32, drives one of the rods 29, 29′, or 29″ which acts by means of lever 30 on a valve spring, e. g. a tension spring, and opens the valve 31 inwardly. But when the boss leaves the lever 32 in question the rod is forced to return into its original position by said spring. It is evident that when the shaft 13 has to overcome a resistance, e. g. one caused by the propeller 34, the crank-case will rotate opposite to the crank shaft in consequence of the reaction. Therefore power can be delivered not only by the shaft 13, but simultaneously by the crank-case 1, as indicated in Fig. 1 by the propeller 41 secured on the shaft 5 of the crank-case. The propellers 41 and 34 are of such dimensions that the moment of inertia of the propeller 34, the crank-shaft 13 and the crank is about equal to the moment of inertia of the propeller 41, the cylinders 2, 2′, 2″, the crank-case 1, the piston and the connecting rods. If this is the case, the crank-case and the crank-shaft will rotate with the same speed in opposite directions. Supposing the crank shaft 13 to be stationary, the pinion 20 and crank-case 1 will rotate and roll on the gear wheel 21, the pinion 20 rotating around its axle. The rotatory motion of pinion 20 is imparted to the internal gear 22 which will rotate around the crank shaft in the same direction as the crank-case but at half the speed thereof. The internal gear or cam 22 will thus be caught up, as it were, by the following valve rod, i. e. it meets the valve rod. In this manner the following rod in the direction of rotation of the crank-case is overtaken, and at each two-thirds of a revolution one of the valve rods 29, 29′, 29″ is driven outwardly. This is necessary because the engine is to operate with a four-stroke cycle. Consequently, during two revolutions the charge in each cylinder must be ignited once, and as there are three cylinders there must be three ignitions every two revolutions. But this is only possible, however, if after the work of one cylinder has terminated the following cylinder is overtaken in the direction of rotation of the engine relatively to its output, i. e. when cylinder 2″ operates after cylinder 2, then cylinder 2′ and then cylinder 2 again, which is obtained in suitable manner by the above described arrangement.

Obviously the mode of operating the valves thus described can be used not only for the inlet but also for the exhaust valves.

In order to supply the different parts of the engine with oil from one central place, the crank shaft 13 (Figs. 8 and 9) is hollow and also the connecting-rods 10, 10′ 10″ and the connecting-rod pivots. The cavities in these parts are in open relation one with another, so that the oil introduced into the crank shaft passes into the connecting-rods and through these into the crosshead pins to the outside face of the pistons and the inner walls of the cylinders.

Referring to Figs. 8 and 9, the crank shaft 13 has a cavity or bore 42. The shaft is surrounded by the annular member 43 rigidly connected by the bracket 44 with the frame 7. This annular member has at its inner periphery two annular ribs 46, 47 inclosing between them the oil groove 48 which is connected through holes 49 with the bore 42. The ring 43 is packed at each side by glands 50, 51 which are each provided with a male thread corresponding to a female thread in the ring 43, so that they can be screwed against the packing 52, 53. The ring 43 has a screw-threaded hole for receiving the socket 54 of the lubricator 55. The oil passing from the latter through socket 54 into the oil groove 48 flows through the hole 49 into the shaft 13 and thence to the various lubricating places.

Owing to the annular member 43 inclosing the shaft 13 like a bearing and being packed at both sides, it does not require to rotate with the shaft 13 but may be firmly connected with the frame 7 without oil being able to flow along outside the shaft.

The central lubricating system represented in Figs. 10 and 10ᵃ is arranged as follows:—In Fig. 10, 13 again designates the crank shaft which, as in the form according to Figs. 1 to 3, is journaled at the one side both in the crank-case 1 and in the frame 7, but at the other side only in the part 15 of the crank-case. Both the shaft 13 and the crank-pin 12 are made hollow for containing oil. In order to prevent the oil filling the entire chamber in the shaft and crank-pin, however, the sleeves 56, 57 and 58 are mounted concentrically in the crank shaft 13, crank-pin 12 and shaft 5 of the crank-case 1, respectively. Accordingly, annular chambers are formed by means of the sleeves in the shaft 13, crank-pin 12 and shaft 38. As clearly shown in Fig. 10ᵃ, 59 is an annular member which does not participate in the rotation of the shaft 13; the same is connected in such manner with the body 60 of the bearing that it does not rotate relatively to the bearing, but can move axially in the direction of the shaft 13. The ring 59 has an annular oil groove 110 and a hole 61. In the latter is secured the tube 62 connecting the ring with the lubricator 63 which may be rigidly connected with the frame 7. On the shaft 13 is secured the ring 64 which rotates with it and is provided with the annular oil groove 65 and some holes 111. The arrangement is such that the annular cavity 110 in the ring 59 opens into the annular cavity 65 in the rotating ring 64. Between the body of the bearing 60 and the ring 59 is a spring 59' tending to press the ring 59 against the ring 64 and causing the same to fit tightly. The crank shaft 13 has a bore 66 which admits of oil entering into the annular chamber formed by the sleeve 56. In agreement with the form according to Figs. 1 to 3, there is secured on the shaft 13 the gear wheel 21 meshing with the pinion 20 journaled on the crank-case. The pinion meshes with the internal gear 22 formed as a cam. This wheel has two bosses or projections 27 each having a hole 69. The annular chamber in the shaft 13 is connected through the hole 67 with the annular chamber in the crank-pin, and through the hole 70 with the hole 71 in the crank-case 1 opening into the bearing 72.

The above described central lubrication operates as follows:—Oil passes from the lubricator 63 and pipe 62 into the hole 61 in the ring 59 and thence through the two grooves 110 and 65 into the hole 111 in the ring 64. From the latter it passes into the annular chamber in the shaft 13 and thence through the hole 68 to the toothing of the gear wheel 21. It is applied by the latter to the toothing of the pinion 21 and to the teeth of the internal gear 22 and passes thence through the holes 69 to the bosses 27. The oil also passes from the annular chamber in the shaft 13 through the hole 67 in the crank into the annular chamber in the crank-pin and thence through the hollow connecting-rods and crosshead pins to the inside cylinder wall. In like manner as the oil passes from the lubricator 63 as described into the shaft 13, it passes from the lubricator 73 through pipe 74 by way of the two rings 75, 76 into the annular chamber in the shaft 5 and hence through hole 77 into the hole 78 of the crank-case opening into the bearing 79.

The ignition apparatus represented in Figs. 11, 11ª and 12 is arranged as follows:—The magneto generator 82 and the insulated current distributer are rigidly connected to the crank shaft 13 of the engine. 1 designates the crank-case with which the gear wheel 85 is rigidly connected. With the latter meshes a pinion 86 firmly secured on the armature shaft of the magneto. For igniting the explosive mixture every cylinder is provided with two sparking-plugs, arranged at a rather small distance from another. The ignition is effected by means of a highly tensioned alternating current, in such a manner that in the very moment in which the explosive mixture is to be ignited an arc-system is formed between the two sparking-plugs.

The arrangement of the magneto is no object of the present application as the same consists in an arrangement, known in all its different parts. The megneto is so arranged that at every revolution of the armature-shaft a highly-tensioned alternating current is produced which forms an arc-system at one of the three igniting points alternately, and thereby effects the ignition of the explosive mixture. The three-cylinder-combustion-engine is supposed to work as a four cycle engine so that at every two revolutions in every one of the three cylinders one ignition is effected. Consequently during two revolutions of the engine there must be effected altogether three ignitions. As always for effecting one ignition the armature-shaft of the magneto must effect one revolution, the ratio of transmission between the gears 85 and 86 must be such, that the gear 86 revolves three times while the gear 85 makes two revolutions. In this case the armature-shaft of the magneto will revolve three times and therefore effect three ignitions, while the gear 85 turns twice.

In the present case it is advisable to arrange the magneto as an alternating-current-machine, in which an H-armature revolves between the poletips of two strong permanent magnets. One part of this armature winding, (the primary) consists of few windings of strong wire, while the other (the secondary) possesses a great number of windings of small wire.

The tension of the current is increased by producing at a certain moment within the primary-current a short-circuit and interrupting the said primary-current. For igniting the charge the spark is employed which is produced when the said primary current is interrupted. The spark obtained when short-circuit is produced is not employed for igniting the charge. At the time at which the primary-current is interrupted an arc-system is formed between the two igniters which effects the explosion.

The carbon holders 87 having the spring-pressed carbon brushes 88 are rigidly but insulatedly connected with the wheel 85 by bolts 89 connected with the cable 100. The magneto 82 is connected by a cable 101 with the current distributing device. This cable is held in position by a metal pin 102 secured in the segment 103, so that an electrical connection is made therewith. The current distributer comprises a flanged iron or bronze ring 104 which is secured immovable on the crank shaft. A ring 105 of insulating material turned smooth is pushed on the ring 104. On the ring 105 is a turned, two-part insulating member 106 and a turned insulating ring 107 arranged against the same. All the pieces of insulation are pressed by a nut 108 against the flange of the ring 104 and thereby held together. In the two-part ring 106 is turned a lateral groove in which another ring is held. The same consists partly of insulation 109, and partly of the metal segment 103, and the latter may not be so long that two carbons can simultaneously rest on it. The pin 102 has one end secured in the segment 103 while its other end rests in the wall of insulation 107. In this manner the cable 101 is firmly held by the pin 102 and simultaneously electrically connected therewith.

The igniting device operates as follows:— Owing to the rotation of the crank-case 1 and the wheel 85 rigidly connected therewith, when the ratio of transmission is correct the pinion 86 and with it the armature of the magneto 82 is rotated as fast as is necessary for generating the requisite electric current. The current is conducted by the cable 101 to the pin 102 and passes thence through the segment 103 to the carbon 88. Then it flows into the bolt 89 and to the cable 100 and from this to the igniters in the cylinders in order to explode the gaseous mixture at the proper moment.

The above described igniting device can be employed for engines having an optional number of cylinders and also for engines in which only the crank-case or only the crank shaft rotates.

In the constructional form of the engine represented in Figs. 13 and 14 $a$ designates the engine shaft on which the crank-case $b$ is rotatable. The wall $d$ is arranged parallel to the end wall $c$ of the crank-case and rigidly connected therewith. In the walls $c$, $d$ are secured the pivots $e^1$ to $e^5$, on which the gear wheels $f^1$ to $f^5$ are journaled. The cams $g^1$ to $g^5$ are rigidly connected with these gear wheels. A pinion $h$ is secured on the shaft $a$; this pinion is half the diameter of one of the wheels $f^1$ to $f^5$ and is so broad that all five gear wheels $f^1$ to $f^5$ can roll thereon. To this end, it requires to be only the breadth of three of these wheels. Cylinders $i^1$ to $i^5$ are rigidly connected with the crank-case, in each of which is a piston whose motion is imparted by the crank $k$ to the shaft $a$. Laterally of each cylinder $i^1$ to $i^5$ is arranged a box or case $n^1$ to $n^5$, each of which is rigidly connected by a part $m^1$ to $m^5$ with the crank-case. Rods $o^1$ to $o^5$, each of which has a collar $w$, extend through the parts $n^1$, $m^1$ to $n^5$, $m^5$. On each collar presses one end of a spring $z$ whose other end presses against the end of its box. Levers $p^1$ to $p^5$, each carrying a roller $q^1$ to $q^5$, are pivoted to the crank-case. The cams $g^1$ to $g^5$ coact with these rollers and thereby displace the rods $o^1$ to $o^5$ whose bottom and top ends project out of the boxes $n^1$ to $n^5$. A support $r$ for a two-armed lever $s$ is provided on each of the cylinders $i^1$ to $i^5$. The one arm of this lever is raised by a rod $o^1$ to $o^5$ and opens the valve $v$ of the cylinders $i^1$ to $i^5$ with the other fork-shaped arm. The valves are opened as soon as the respective cams $g^1$ to $g^5$ coact with the rollers $q^1$ to $q^5$ and thereby lift the rods $o^1$ to $o^5$ against the tension of the springs $z$. When the cams $g^1$ to $g^5$ leave the rollers $q^1$ to $q^5$, however, the rods $o^1$ to $o^5$ are returned into their original position by the springs $z$. Owing to the springs $z$ being accommodated in boxes arranged laterally of the cylinders, the springs are protected from too great heat so that the same are not glowed and their tension does not suffer. As the herein described engine is supposed to operate with a four-stroke cycle, every two revolutions there must be five ignitions. The cylinder following in the direction of rotation must therefore be left out each time. The gear wheels $f^1$ to $f^5$ must accordingly be so adjusted relatively to their cams that first cylinder $i^1$, then cylinder $i^3$, then cylinders $i^5$, $i^2$ and $i^4$ and then cylinder $i^1$ again arrives into the operative position which can be brought about without further ado by this arrangement. Obviously, instead of five cylinders three, seven, nine and so on may be arranged, without departing from the spirit and scope of my invention.

I claim:—

1. In a rotary, internal combustion engine comprising a crank-case and a crank-shaft rotatable in opposite directions, the combination, with a frame, of a crank-case having a lateral shaft journaled at one side thereof in the frame, a crank-shaft journaled coaxially with said shaft in the crank-case and at the other side of the latter in the frame, three cylinders secured on said crank-case, a piston in each cylinder, each piston being connected to one end of a connecting-rod, one connecting rod having a strap surrounding the crank-pin of the crank-shaft, the two other connecting-rods each having two straps surrounding the former strap, one strap of each of the two latter connecting-rods being surrounded by the other strap of the other of said two connecting-rods.

2. In a rotary, internal combustion engine comprising a crank-case and a crank-shaft rotatable in opposite directions, the combination, with a frame, of a crank-case having a lateral shaft journaled at one side thereof in the frame, a crank-shaft journaled coaxially with said shaft in the crank-case and at the other side of the latter in the frame, cylinders having inlet valves and exhaust valves secured on said crank-case, levers fulcrumed on said cylinders for operating said valves, rods mounted on the cylinders and on the crank-case for operating said levers, one cam mounted revolubly on the crank-case for actuating said rods, and means driven by the crank-case for rotating said cam at half the speed of the crank-case.

3. In a rotary, internal combustion engine comprising a crank-case and a crank-shaft rotatable in opposite directions, the combination, with a frame, of a crank-case having a lateral shaft journaled at one side thereof in the frame, a crank-shaft journaled coaxially with said shaft in the crank-case and at the other side of the latter in the frame, cylinders having inlet valves and exhaust valves secured on said crank-case, levers fulcrumed on said cylinders for operating said valves, rods mounted on the cylinders and on the crank-case for operating said levers, an internal gear formed externally as a cam mounted revolubly on the crank-case for actuating said rods, a gear wheel half the diameter of said gear secured on the crank-shaft, and a pinion half the diameter of said gear wheel journaled in the crank-case and meshing with said internal gear and with said gear wheel.

4. In a rotary, internal combustion engine comprising a crank-case and a crank-shaft rotatable in opposite directions, the combination, with a frame, of a crank-case having a lateral shaft journaled at one side thereof in the frame, a crank-shaft journaled coaxially with said shaft in the crank-case and at the other side of the latter in the frame, cylinders having igniters secured on said crank-case, current distributing means and an electromagnetic generator connected therewith secured on the crank-shaft, brushes mounted on the crank-case, sliding on said distributing means and connected with said igniters, a pinion on the axle of said generator, and a gear wheel secured to said crank-case and in mesh with said pinion.

5. In a rotary, internal combustion engine comprising a crank-case and a crank-shaft rotatable in opposite directions, the combination, with a frame, of a crank-case having a lateral shaft journaled at one side thereof in the frame, a crank-shaft journaled coaxially with said shaft in the crank-case and at the other side of the latter in the frame, cylinders having igniters secured on said crank-case, current distributing means secured on the crank-shaft; said distributing means comprising a flanged metal ring secured on the crank-shaft, an insulating ring on the flanged ring, and a metal segment in the insulating ring; a magneto generator connected with said segment, brushes mounted on the crank-case, adapted to slide on the segment and connected with said igniters, a pinion on the axle of said generator, and a gear wheel secured to said crank-case and in mesh with said pinion.

In testimony whereof, I affix my signature in the presence of two witnesses.

BERNHARD ESCHER.

Witnesses:
 ETTA R. IFFT,
 ANN LYYSERT.

---

Copies of this patent may be obtained for five cents each, by addressing the "Commissioner of Patents, Washington, D. C."